(12) United States Patent
Bellemare et al.

(10) Patent No.: US 12,407,891 B2
(45) Date of Patent: Sep. 2, 2025

(54) SYSTEMS AND METHODS FOR CONCURRENTLY PLAYING MULTIPLE REMOTELY STORED MEDIA FILES IN A WEB BROWSER

(71) Applicant: GENETEC INC., Montréal (CA)

(72) Inventors: David Bellemare, Saint-Eustache (CA); Samuel Ledoux, Sainte-Thérèse (CA)

(*) Notice: Subject to any disclaimer, the term of this patent is extended or adjusted under 35 U.S.C. 154(b) by 332 days.

(21) Appl. No.: 17/512,341

(22) Filed: Oct. 27, 2021

(65) Prior Publication Data

US 2023/0125371 A1    Apr. 27, 2023

(51) Int. Cl.
*H04N 21/43* (2011.01)
*H04N 21/472* (2011.01)
*H04N 21/6587* (2011.01)

(52) U.S. Cl.
CPC . *H04N 21/43072* (2020.08); *H04N 21/47217* (2013.01); *H04N 21/6587* (2013.01)

(58) Field of Classification Search
CPC ....... H04N 21/43072; H04N 21/47217; H04N 21/6587
See application file for complete search history.

(56) References Cited

U.S. PATENT DOCUMENTS

| | | | |
|---|---|---|---|
| 6,873,353 | B1 | 3/2005 | Valkonen et al. |
| 7,697,815 | B2 | 4/2010 | Nakajima et al. |
| 8,113,844 | B2 | 2/2012 | Huang et al. |
| 8,274,563 | B1 | 9/2012 | Bunch |
| 9,098,611 | B2 | 8/2015 | Pinter et al. |
| 9,210,300 | B2 | 12/2015 | Oami et al. |
| 9,344,606 | B2 | 5/2016 | Hartley et al. |
| 9,430,509 | B2 | 8/2016 | Elmqvist Wulcan et al. |
| 9,728,228 | B2 | 8/2017 | Palmer et al. |

(Continued)

FOREIGN PATENT DOCUMENTS

| | | |
|---|---|---|
| CN | 103702013 A | 4/2014 |
| CN | 105262979 A | 1/2016 |

(Continued)

OTHER PUBLICATIONS

Mayer-Patel, Ketan, et al. "Synchronized continuous media playback through the World Wide Web." Proceedings of the Fourth ACM international Conference on Multimedia. 1997.

(Continued)

*Primary Examiner* — Sherrod L Keaton
(74) *Attorney, Agent, or Firm* — Anglehart et al.

(57) ABSTRACT

Systems and methods to seek a requested playback time for multiple remotely stored media files concurrently playing in a web browser running on a client computer, including providing, on a web page displayed by the web browser, a reference timeline based on metadata of each media file of a set of selected media files comprising media content. A seek instruction is received comprising a first requested playback time on the reference timeline. A subset of the media files which are to play at the first requested playback time on the reference timeline is identified based on the metadata of each media file of the set of selected media files. The media content of the subset of media files is retrieved for the first requested playback time from remote storage. The retrieved media content is output to corresponding display areas provided on the web page.

30 Claims, 10 Drawing Sheets

(56) References Cited

U.S. PATENT DOCUMENTS

| | | | |
|---|---|---|---|
| 2006/0171453 | A1 | 8/2006 | Rohlfing et al. |
| 2008/0291279 | A1 | 11/2008 | Samarasekera et al. |
| 2011/0083073 | A1 | 4/2011 | Atkins et al. |
| 2011/0291831 | A1 | 12/2011 | Subbian et al. |
| 2012/0001755 | A1* | 1/2012 | Conrady ............... H04N 7/186 348/143 |
| 2013/0124999 | A1* | 5/2013 | Agnoli ............ H04N 21/2743 715/723 |
| 2013/0188932 | A1* | 7/2013 | Hartley ................. H04N 9/87 386/282 |
| 2017/0180780 | A1* | 6/2017 | Jeffries ............ H04N 21/43072 |
| 2019/0347915 | A1 | 11/2019 | Lai |
| 2020/0126381 | A1* | 4/2020 | Yudichak ......... G08B 13/19691 |

FOREIGN PATENT DOCUMENTS

| | | |
|---|---|---|
| CN | 105898210 A | 8/2016 |
| CN | 106331822 A | 1/2017 |
| CN | 106792102 A | 5/2017 |
| CN | 107018442 A | 8/2017 |
| CN | 111585684 A | 8/2020 |
| CN | 112399227 A | 2/2021 |

OTHER PUBLICATIONS

Smith, Brian, et al., "A TCL/TK continuous media player." Proceedings Tcl 1993 Workshop. 1993.

Boucher, J. A., et al. "Design and Performance of a Multi-Stream MPEG-I System Layer Encoder/Player." IS&T/SPIE Symposium on Electronic Imaging Science & Technology. 1995.

Wang, Oliver, et al. "Videosnapping: Interactive synchronization of multiple videos." ACM Transactions on Graphics (TOG) 33.4 (2014): 1-10.

Leslie Lamport, "Time, Clocks, and the Ordering of Events in a Distributed System". Communiations of the ACM. Jul. 1978, vol. 21, No. 7. pp. 558-565.

Mistry, Shailen S., "Continuous Media Toolkit," Impact of New Information Resources: Multimedia and Networks, Infosys 296A, School of Information Management Systems, University of California Berkley, http://besser.tsoa.nyu.edu/impact/f96/Reviews/smistry/ (Fall 1996).

Haldas, Mike, "View Security Cameras from Mac Surveillance Software," CCTV Camera Pros, https://www.cctvcamerapros.com/View-Security-Cameras-Mac-Software-s/998.htm#/videos (2022).

* cited by examiner

SYSTEMS AND METHODS FOR CONCURRENTLY PLAYING MULTIPLE REMOTELY STORED MEDIA FILES IN A WEB BROWSER

BACKGROUND

Technical Field

The present disclosure generally relates to concurrently playing multiple remotely stored media files in a web browser running on a client computer.

Description of the Related Art

In conventional solutions for playing multiple video streams, video streams locally stored on a computer may be played back using an application running on the computer. In such a case, a specific absolute time in a video stream is accessible because the entire video stream is locally stored before playback. Such a system may play back multiple stored video streams with a particular granularity. However, such an approach requires all of the video files to be retrieved and stored in advance, even if only a small portion of the video is of interest, which is inefficient. This is especially problematic for surveillance video files, which may have a duration of hours or days.

In conventional approaches which involve streaming video files via a network, a client computer receiving the stream does not have access to full video files when streaming is initiated and therefore may not be able to determine at which frame to start play when the user seeks to an unknown playback time, i.e., a playback time for which there is no corresponding video stream data in the buffer, without adding complexity and/or decreasing efficiency. This is especially true for video streams composed of multiple separate files. Therefore, there is a need for improved techniques for network-based video streaming.

BRIEF SUMMARY

The following presents a simplified summary of one or more implementations in accordance with aspects of the present disclosure in order to provide a basic understanding of such implementations. The disclosure describes web browser-based implementations for concurrently playing multiple remotely stored media files in multiple display areas. The media of the display areas plays concurrently (e.g., each display area shows video occurring at 2:05 pm captured by different cameras). One or more of the display areas may be associated with multiple media files or segments (e.g., 2:00 pm to 2:10 pm is in a first video file or first segment and 2:10 pm to 2:20 pm is in a second video file of second segment). In one aspect, when a seek instruction is received to playback media at a given absolute time (e.g., 2:05 pm) of a reference timeline, the relative start time of each media file of each display area can be determined (e.g., the relative start time is 5:00 minutes from the start of a video file having an absolute start time of 2:00 pm when the seek time corresponds to 2:05 pm). This process may include identifying which media file of multiple media files (or identifying which segment of multiple segments) associated with a given display area that is to be displayed in that display area. In other words, when a seek to a given time is made by a user, it can be determined for each display area which media file and where playback is to start for that media file. Another aspect is that the relative times of each media file playing in each display area can be monitored and when one or more of the media files being played is out of sync with the other media files, the playback of the media files can be re-synchronize in the display areas.

The web browser-based implementations described herein overcome certain technical challenges of concurrently playing multiple remotely stored media files in a web browser, which are not relevant to desktop application solutions. Desktop applications typically have access to the full media files. By having full file access, these solutions can get access to each frame. Thus, when a user seeks to an absolute time, desktop solutions can determine the exact frame or sample in each media file to go to and begin playing. However, in a web-based solution that does not have full access to the media files, the web browser does not have access to all of the frames and therefore may not be able to determine which frame to start playing when the user seeks to a given absolute time. Accordingly, in one or more embodiments, when the user seeks to an unknown time (i.e., a time which is not currently in the buffer) of the reference timeline, where to start each media file of each display area is determined as described herein. This becomes challenging when the media of a given display area is composed of multiple media files, and in one or more embodiments, a particular media file and where in that media file to begin playback are determined. When a seek instruction is received, in one or more embodiments, a particular media file for each display area and where to start playback of each particular media file is determined, and the media data at this appropriate time is provided to the buffers of the media players associated with each display area. To provide a smooth and seamless playback of these multiple media files of the display areas, in one or more embodiments, each buffer receives a certain amount of data before playback can occur. The time it takes each of these buffers to load can vary. Accordingly, in one or more embodiments, the state of each buffer is monitored and when all of the buffers are in a state suitable for playback, then playback can occur. In one or more embodiments, the playback of the media being played is monitored and when it is determined that a given media file is out of sync, each media file is paused and then adjusted to the correct time before playback resumes.

Disclosed embodiments provide a method to seek a requested playback time for multiple remotely stored media files concurrently playing in a web browser running on a client computer having one or more processors, memory, and a network interface. The method includes providing, on a web page displayed by the web browser running on the client computer, a reference timeline based at least in part on metadata of each media file of a set of selected media files comprising media content. The method further includes receiving a seek instruction comprising a first requested playback time on the reference timeline. The method further includes identifying a subset of media files, of the set of selected media files, which are to play at the first requested playback time on the reference timeline based at least in part on the first requested playback time on the reference timeline and the metadata of each media file of the set of selected media files. The method further includes retrieving at least a portion of the media content of each media file of the subset of media files, including media content of each media file of the subset of media files for the first requested playback time, from remote storage via the network interface of the client computer. The method further includes outputting, respectively, the retrieved media content of each media file of the subset of media files to a corresponding display area of a plurality of display areas provided on the web page.

Embodiments may include one or more of the following features.

In the receiving of the seek instruction, the seek instruction may be produced by user interaction with controls provided on the web page displayed by the web browser running on the client computer. In the identifying of the subset of media files which are to play at the first requested playback time on the reference timeline, the method may further include calculating a respective first expected playing time of each media file, of the set of selected media files, based at least in part on the first requested playback time on the reference timeline and the metadata of each media file of the set of selected media files. The calculating of the respective first expected playing time of each media file, of the set of selected media files, may be based at least in part on a respective start time of each media file of the set of selected media files. The first requested playback time on the reference timeline may be expressed as an absolute time and the respective first expected playing time of each media file, of the set of selected media files, may be expressed as a relative time based at least in part on a respective start time of each media file of the set of selected media files. The retrieving of at least a portion of the media content of each media file of the subset of media files, including media content of each media file of the subset of media files for the first requested playback time, may be based at least in part on the respective first expected playing time of each media file of the subset of media files.

In the identifying a subset of media files which are to play at the first requested playback time on the reference timeline, the subset of media files may be identified to exclude media files, of the set of selected media files, having a first expected playing time which is outside of a range defined by a start time and an end time of a respective media file of the set of selected media files. A start time of the reference timeline may be determined by an earliest start time of the set of selected media files and an end time of the reference timeline may be determined by an latest end time of the set of selected media files. The method may further include loading at least a portion of the media content of each media file of the set of selected media files from remote storage via the network interface of the client computer into a respective media player of a plurality of media players instantiated on the client computer, wherein a subset of media players, of the plurality of media players, corresponds to the subset of media files.

The outputting, respectively, the retrieved media content of each media file of the subset of media files may be performed via a controller having a set of defined operating states. In such a case, the controller may enter a waiting-to-play operating state in which the controller instructs each media player of the subset of media players to enter a paused state; and the controller may enter a playing operating state, when the media players of the subset of media players provide an indication of being ready to play, in which the controller instructs each media player of the subset of media players to enter a play state.

The method may further include periodically adjusting a current player time of each media player of the subset of media players, the current player time corresponding to a playing time of a media file loaded therein, while each media player of the subset of media players outputs, respectively, the media content of each media file of the subset of media files to the corresponding display area of the plurality of display areas. The periodically adjusting the current player time of each media player of the subset of media players may include receiving periodically, by the controller, an actual player time from each media player of the subset of media players; comparing, for each media player of the subset of media players, the received actual player time with the current player time to determine a player time difference; entering the waiting-to-play operating state by the controller when the player time difference of one or more media players of the subset of media players exceeds a defined threshold; instructing each media player of the subset of media players to seek the current player time; and entering the playing operating state of the controller when the media players of the subset of media players provide an indication of being ready to play.

The loading of the at least a portion of the media content of each media file of the set of selected media files into a respective media player of the plurality of media players may be performed via a controller having a set of defined operating states, with the controller entering a paused operating state, in which the controller instructs each media player of the subset of media players to enter a paused state. In such a case, the method may further include loading a specified media player, of the plurality of media players, with the metadata and at least a portion of the media content of a specified media file of the remotely stored media files. The method may further include calculating a new reference timeline based at least in part on the metadata of the specified media file. The method may further include registering the specified media player with the controller by sending to the controller an identifier and a playback state of the specified media player and at least a portion of the metadata of the specified media file, wherein said at least a portion of the metadata comprises at least two of: a start time, a duration, and an end time, of the specified media file.

The method may further include receiving a seek instruction comprising a second requested playback time on the reference timeline. A second subset of media files, of the set of selected media files, may be identified which are to play at the second requested playback time on the reference timeline based at least in part on the second requested playback time on the reference timeline and the metadata of each media file of the set of selected media files. A respective second expected playing time of each media file, of the set of selected media files, may be calculated based at least in part on the second requested playback time on the reference timeline and the metadata of each media file of the set of selected media files. The method may further include outputting, respectively, the media content of each media file of the second subset of media files to a corresponding display area of the plurality of display areas provided on the web page.

Disclosed embodiments provide a method to concurrently display and play back multiple remotely stored media files in a web browser running on a client computer having one or more processors, memory, and a network interface. The method includes displaying, by the web browser running on the client computer, a web page defining a plurality of display areas to display media content. The method further includes loading at least a portion of media content of each media file, of a set of selected media files, from remote storage via the network interface of the client computer into a respective media player of a plurality of media players instantiated on the client computer. A reference timeline is determined based at least in part on metadata of each media file of the set of selected media files. The method further includes calculating a first expected player time of each media player of the plurality of media players based at least in part on a specified playback time on the reference timeline and the metadata of the respective media file of each media player of the plurality of media players. The method further includes identifying a subset of media players, of the plurality of media players, which are to play at the specified playback time on the reference timeline based at least in part on the first expected player time of each media player of the plurality of media players. Each media player of the subset of media players is instructed to seek the respective first expected player time of each media player of the subset of media players. The method further includes instructing, upon receiving a play instruction from user interaction with controls provided on the web page displayed by the web browser running on the client computer, the media players of the subset of media players to output, respectively, the media content thereof to a corresponding display area of the plurality of display areas provided on the web page.

A system to seek a requested playback time for multiple remotely stored media files concurrently playing in a web browser, the system including a client computer comprising one or more processors, memory, and a network interface, the memory storing a set of instructions that, as a result of execution by the one or more processors, cause the one or more processors to perform methods described herein.

A non-transitory computer-readable storage medium may be summarized as having computer-executable instructions stored thereon that, when executed, cause at least one computer processor to perform methods described herein.

DETAILED DESCRIPTION

In the following description, certain specific details are set forth to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Reference throughout this specification to "one implementation," "an implementation," or "implementations" means that a particular feature, structure or characteristic described in connection with the implementation(s) is included in at least one implementation. Thus, appearances of the phrases "in one implementation," "in an implementation," or "in implementations" in the specification are not necessarily all referring to the same implementation(s). Furthermore, the particular features, structures, or characteristics may be combined in any suitable manner in one or more implementations. As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

Figure 1:
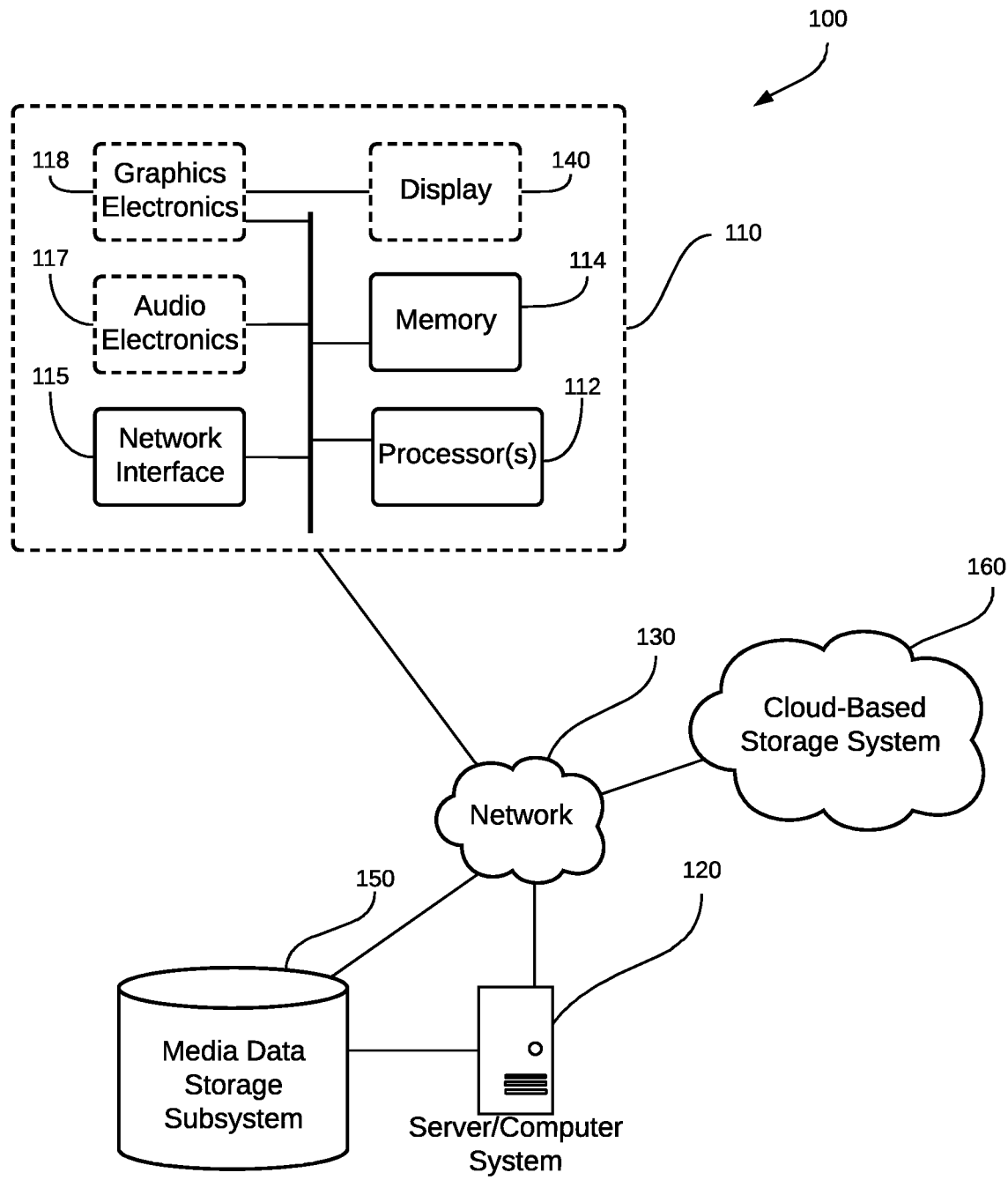
FIG. 1 is a block diagram of a system to concurrently play multiple remotely stored media files, according to an illustrated embodiment.

FIG. 1 is a block diagram of a system 100 to concurrently play multiple remotely stored media files. Such a system 100 may be used, for example, to concurrently playback multiple video streams—possibly from multiple sources and/or points of view—relating to a particular location and/or incident. In implementations, the system 100 includes a computer system, referred to herein as a client computer 110, which. The client computer 110 has one or more processors 112, memory 114, e.g., random access memory (RAM), to store data and program instructions to be executed by the one or more processors 112. The client computer 110 also includes a network interface 115, which may be implemented as a hardware and/or software-based component, such as a network interface controller or card (NIC), a local area network (LAN) adapter, or a physical network interface, etc. The client computer 110 may also include audio electronics 117 to output audio to a user, graphics electronics 118 to render video data, e.g., a video graphics card and/or processor, and a display 140 to display the user interface and rendered video to the user. The client computer 110 executes—using the one or more processors 112—computer program instructions stored in memory 114 to carry out methods described herein.

The client computer 110 may run a web browser to carry out the methods described herein, in which case the computer program instructions may be retrieved from a remote computer system, e.g., a remote server/computer system ("server") 120 connected via a network 130, e.g., a public network such as the Internet. In implementations, the computer program instructions may be stored at least in part by the client computer 110 in memory 114 (e.g., random access memory) and/or non-transient storage media (not shown). The computer program instructions may include instructions to implement a web page, which the web browser presents on the display 140 of the client computer 110. For example, instructions in the form of Hypertext Markup Language (HTML) and various types of scripting languages, e.g., JavaScript, may be executed to provide the web page with a particular appearance and to allow the web page to perform particular actions to facilitate the methods described herein, e.g., by providing a user interface. Alternatively, an application may be run on the client computer 110 to carry out the methods described herein. In such a case, the application may be downloaded from a remote computer system, e.g., the server 120.

The server 120 may include a media data storage subsystem 150 to store media content, i.e., media data, such as, for example, video stream data received from surveillance video cameras and stored as media files. The server 120 and the media data storage subsystem 150 may be connected directly or via a public network 130 or a local network (represented in the figure by a connecting line). In implementations, the server 120 may store at least a portion of the media data in a remote storage system, such as a cloud-based storage system 160 accessed via the network 130 or a private network. In implementations, the server 120 itself may have a cloud-based computing infrastructure, in which case methods described herein may be implemented by one or more virtual processors of the cloud-based computing infrastructure. In implementations, the client computer 110 may interact directly with one or more media data storage subsystems 150 to retrieve media data, rather than via the server 120.

Figure 2:
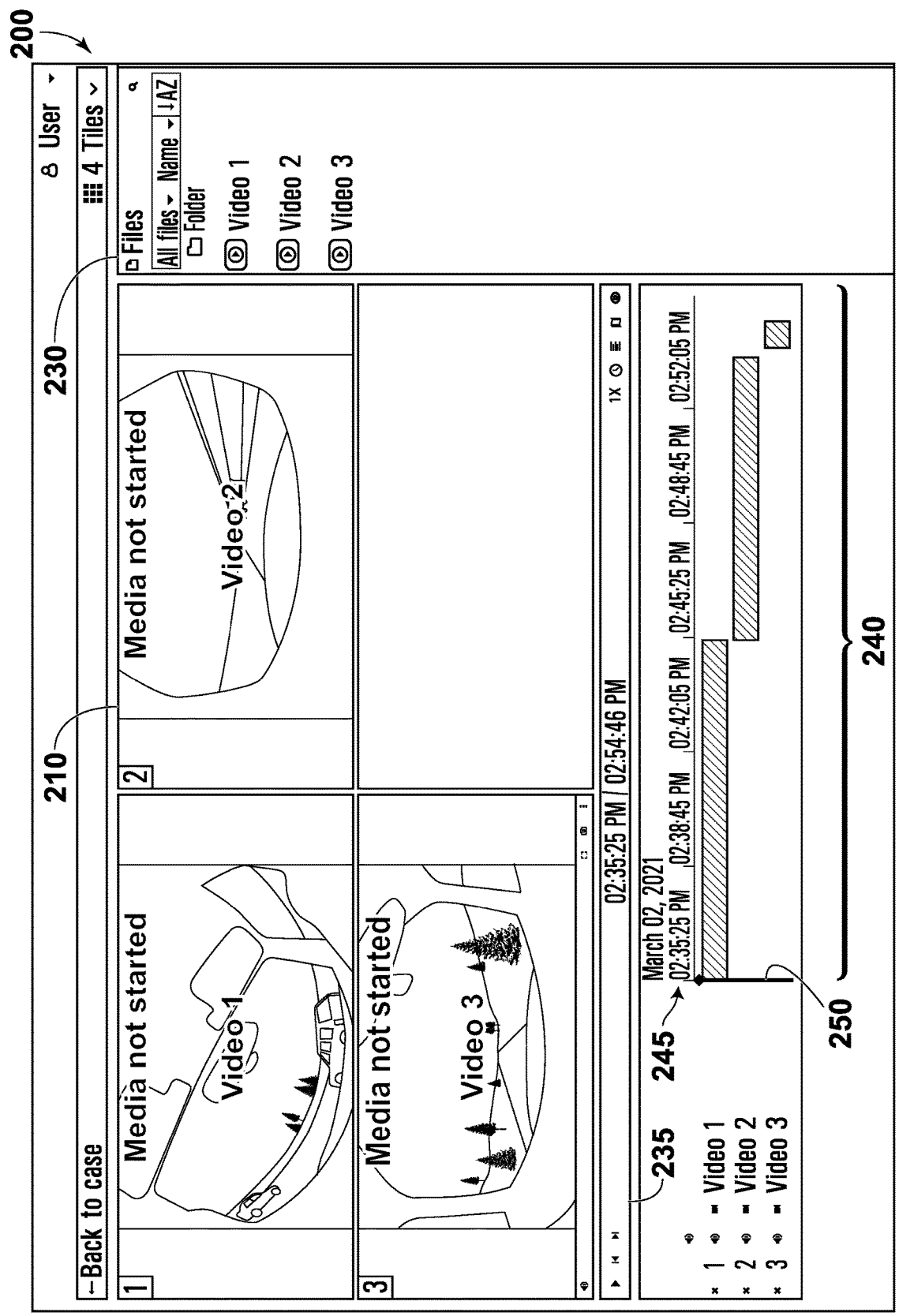
FIG. 2 depicts an example of a web page presenting a number of defined display areas to concurrently output retrieved media content of a number of corresponding media files.

FIG. 2 depicts an example of a web page 200—displayed by the web browser on the display 140 of the client computer 110—presenting a number of defined display areas 210 to concurrently output retrieved media content of a number of corresponding media files. The media files (e.g., audio files, video files, etc.) contain the media content and may also contain metadata characterizing the media content. For example, the metadata of each media file may include one or more of a start time, an end time, and a duration of the media content, e.g., the start time (absolute) and duration of a segment of video stream data received from surveillance video cameras. In implementations, video stream data received from a particular video camera may be divided into segments stored in separate media files, in which case each of the segments would characterized by its own set of metadata.

In implementations, a set of media files may be selected by a user from a list 230 of available media files. For example, individual media files may be selected from a list 230 of available media files and dragged into corresponding display areas 210 using a pointer, e.g., a mouse, via a user interface provided by an operating system of the client computer 110 in conjunction with the web browser presenting the web page 200. Alternatively, the web page 200 may provide a user interface element (not shown), e.g., a button, which allows a selected media file to be selected from a file system menu provided by the operating system of the client computer 110 in conjunction with the web browser. Thus, these features provide for outputting the retrieved media content of a set of selected media files to corresponding display areas 210 provided on the web page 200. In the example depicted, three media files have been selected as the set of selected media files for display in three display areas 210 of the screen. The web page 200 may provide a set of controls 235, such as buttons to begin play and move forward or back in time, e.g., by frames.

The web page 200 may present a reference timeline 240 based at least in part on metadata of each media file of the set of selected media files. The reference timeline 240 may include a horizontal time axis 245 with absolute or relative time values as labels, and date information may also be displayed. In the example depicted, the reference timeline 240 presents a bar chart below the time axis 245 representing the start time, duration, and end time of each media file of the set of selected media files. In implementations, a start time of the reference timeline may be determined by an earliest start time of the selected media files and an end time of the reference timeline may be determined by a latest end time of the selected media files. In the example depicted, the earliest start time of the selected media files is 2:35:25 PM (associated with the first media file) and the latest end time is 2:54:46 PM (associated with the third media file).

The web page 200 may present a user interface element on the reference timeline 240, e.g., a slider 250, which allows a user to select a particular requested playback time on the reference timeline 240 at which to play the set of selected media files in the display areas 210. In implementations, the slider 250 can moved to a particular requested playback time, e.g., by using a mouse or other pointing device via a user interface provided by an operating system of the client computer 110 in conjunction with the web browser presenting the web page 200, or the user can click a particular requested playback time on the reference timeline 240 (e.g., by clicking on the time axis 245) and the slider 250 will move to the particular requested playback time. In the example depicted, the slider 250 is at the start time of the reference time line 240 and, consequently, the playing of the media files has not started (as indicated by the "Media not started" message in the display areas 210).

Figure 3:
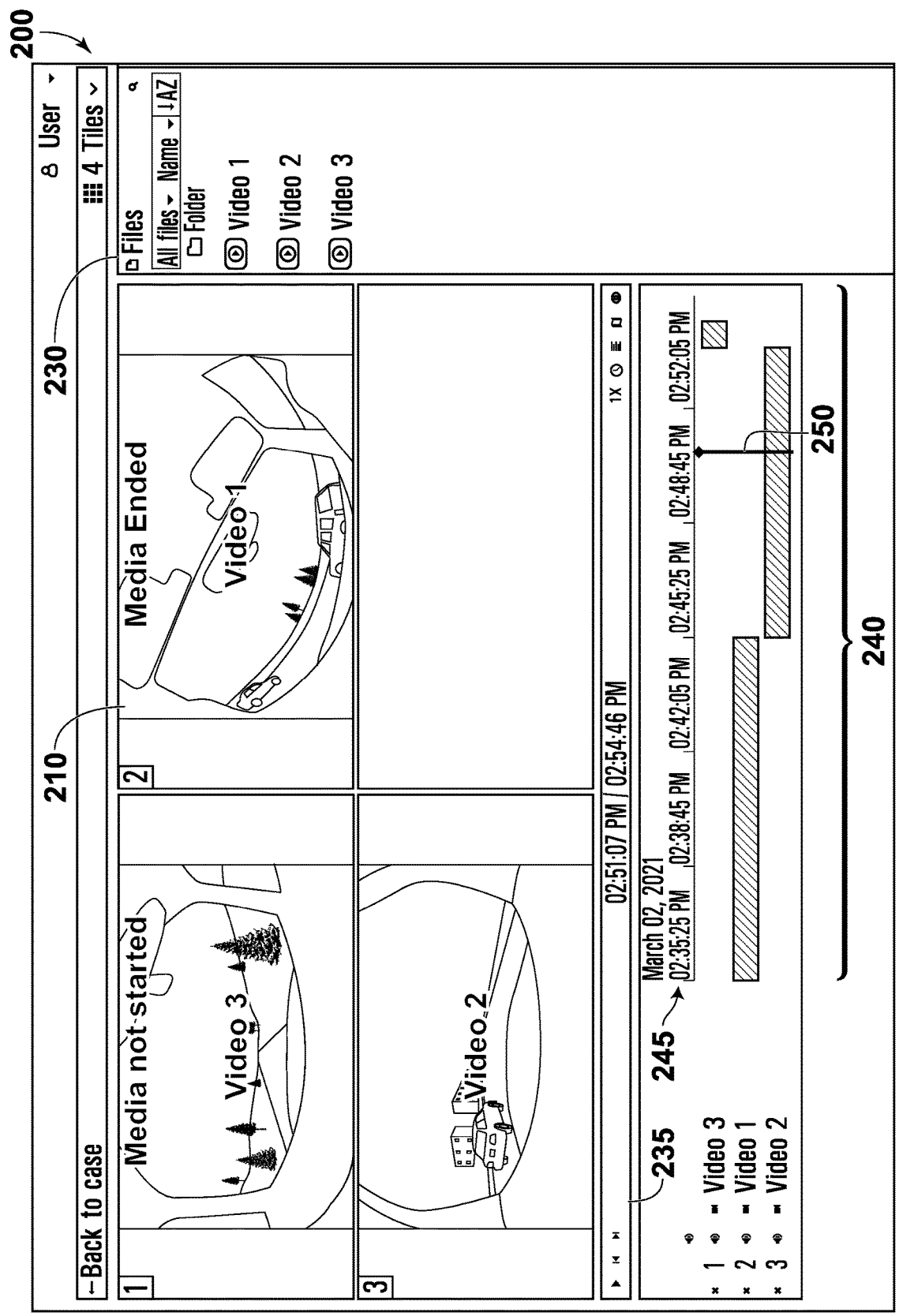
FIGS. 3 and 4 depict examples of a web page displayed by the web browser showing a particular playback time being requested on the reference timeline.
Figure 4:
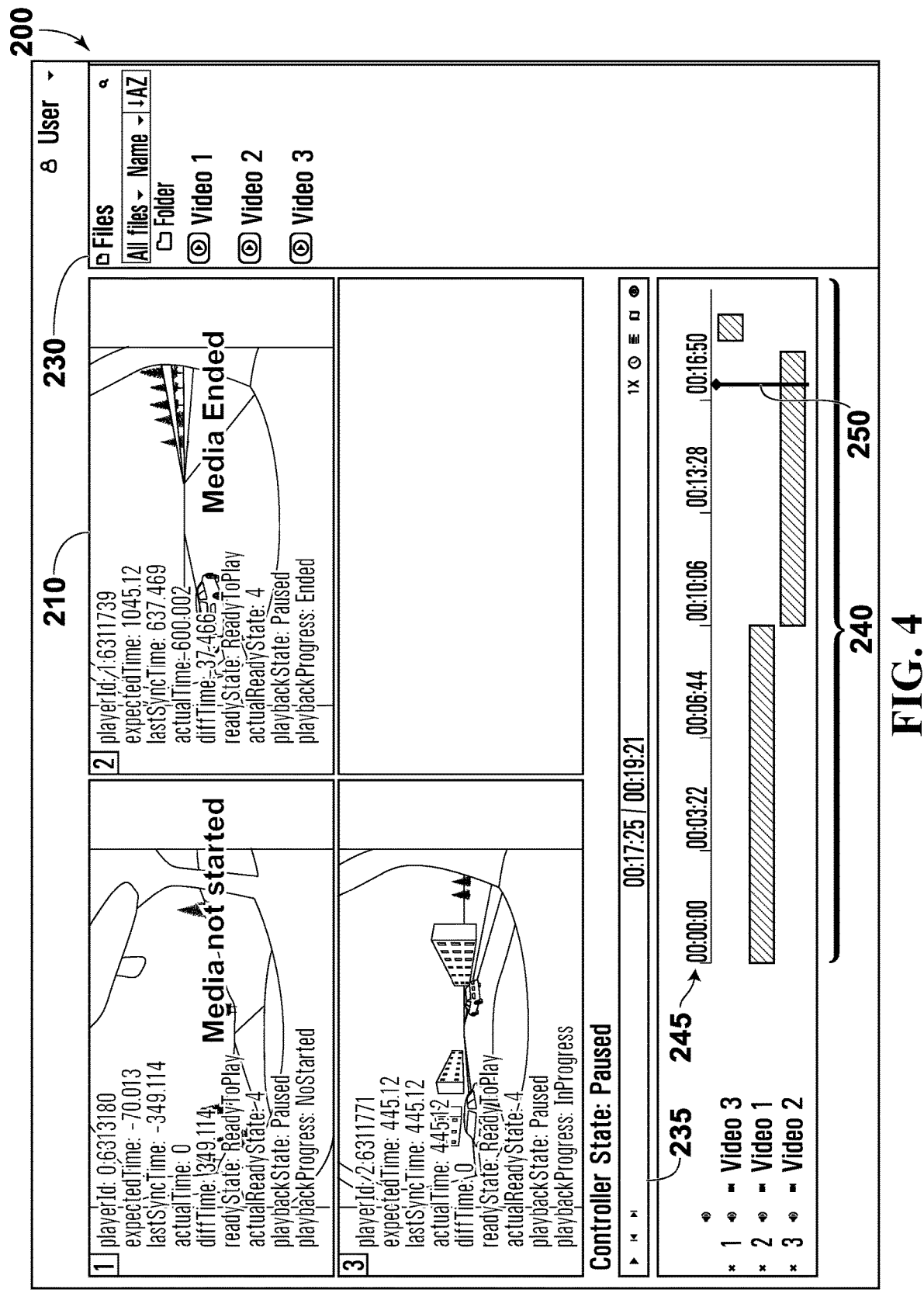

FIGS. 3 and 4 depict examples of a web page 200 displayed by the web browser showing a particular playback time being requested on the reference timeline 240, e.g., by moving a slider 250 or by effectuating some other type of user interface element. The movement of the slider 250 results in a seek instruction which includes the requested playback time on the reference timeline 240. In other words, a seek instruction is produced by user interaction with controls provided on the web page 200 displayed by the web browser running on the client computer 110.

As explained above, the client computer 110 executes— using one or more processors—computer program instructions stored in memory to carry out methods described herein. Upon receiving the seek instruction, the client computer 110 identifies a subset of media files, of the set of selected media files, which are to play in the display areas 210 of the web page 200 at the requested playback time on the reference timeline. In other words, because each of the media files in the set of selected media files does not necessarily extend across the entire reference timeline 240, at a given time, only a subset of the selected files should be playing. The remaining media files, i.e., the media files which should not be playing at the requested playback time, may be displayed in their corresponding display areas 210 frozen on the first frame, frozen on the last frame, or blanked out (an area in which no media file has been loaded may also be blanked out, as shown in the figures). In implementations, the web page 200 may display an appropriate message in the corresponding display areas 210 of the media files which should not be playing at the requested playback time to explain the status of these media files, e.g., "Media not started" or "Media ended," as shown in the figures.

In the example depicted in FIG. 3, an absolute time of 2:51:07 PM has been selected as the requested playback time via the slider 250 on the reference timeline 240. At the requested playback time, the first media file of the set of selected media files (displayed in the upper left-hand corner of the display areas 210) has not started playing, as indicated by the bar on the first row of the reference timeline 240 bar chart. The second media file of the selected media files (displayed in the upper right-hand corner of the display areas 210) has ended play, as indicated by the bar on the second row of the reference timeline 240 bar chart. The third media file of the selected media files (displayed in the lower left-hand corner of the display areas 210) should be playing at the requested playback time, as indicated by the third bar on the reference timeline 240 bar chart.

In the example depicted in FIG. 4, the reference timeline 240 is expressed in terms of relative time, e.g., time relative to the earliest start time of the set of selected media files. A relative time of 00:17:25 has been selected as the requested playback time via the slider 250 on the reference timeline 240. In implementations, the identification of the subset of media files, of the selected media files, which are to play in the display areas 210 of the web page 200 at the requested playback time on the reference timeline 240 may be based at least in part on the particular requested playback time and the metadata of each media file of the selected media files. In such a case, an expected playing time, which may be expressed as a relative time, may be calculated for each media file of the selected media files based at least in part on a difference between the requested playback time and a respective start time of each media file. The identified subset of media files which are to play at the requested playback time on the reference timeline 240 excludes media files having an expected playing time which is outside of a range defined by a start time and an end time of the respective media file. For example, a media file having an expected playing time which is a negative value, i.e., a time prior to the relative start time of zero, would be excluded from the subset of media files which are to play at the requested playback time. Similarly, a media file having an expected playing time greater than the end time of the media file, i.e., a time past the relative end time, would be excluded from the subset of media files which are to play at the requested playback time.

In the example of FIG. 4, at the requested playback time of 00:17:25 (relative time), the first media file of the set of selected media files (displayed in the upper left-hand corner of the display areas 210) has an expected playing time ("expectedTime") of −70.013 seconds and, thus, play of the first media file has not started (as indicated by the bar on the first row of the reference timeline 240 bar chart). In other words, the first media file is excluded from the subset of media files which are to play at the requested playback time. The second media file of the selected media files (displayed in the upper right-hand corner of the display areas 210) has an expected playing time ("expectedTime") of 1045.12 seconds (i.e., 00:17:25), which is past its end time of 00:10:06 and, thus, play of the second media file has ended (as indicated by the bar on the second row of the reference timeline 240 bar chart). The third media file of the selected media files (displayed in the lower left-hand corner of the display areas 210) has an expected playing time of 445.12 seconds (i.e., 00:07:25), which is between its start time and end time and, thus, the third media file should be playing at the requested playback time (as indicated by the third bar on the reference timeline 240 bar chart). It should be noted that in the example depicted, although the third media file should be playing at the requested playback time, the system is in a paused mode in which all media files are paused. Upon entering a playing mode, only the third media file would play in this example.

The client computer 110 retrieves at least a portion of the media content of each media file of the identified subset of media files, including media content at the requested playback time, e.g., from the server 120, via the network interface 115 of the client computer 110. In implementations, the retrieving of the media content of each media file of the subset of media files is based at least in part on the respective expected playing time of each media file. For example, if the expected playing time of a media file is 1 minute, 20 seconds (relative to a start time of zero), then a portion of the media content beginning at 1 minute, 20 seconds can be retrieved. The client computer 110 outputs, respectively, the retrieved media content of each media file of the subset of media files to a corresponding display area 210 of a plurality of display areas 210 provided on the web page 200.

In some embodiments, the client computer 110 may retrieve at least a portion of media content of each media file of the selected media files. This retrieving may be done prior to the determination of the reference timeline and the calculating of the expected player time of each media file of the selected set of media files. In such a case, the identifying of the subset of media files which are to play at a specified playback time on the reference timeline may be based at least in part on the expected player time of each media file of the set of selected media files. For example, the subset of media files which are to play at a specified playback time may be identified by excluding media files, of the selected set of media files, having an expected player time (expressed in relative time) which is less than zero or greater than an end time of the respective media file.

Figure 5:
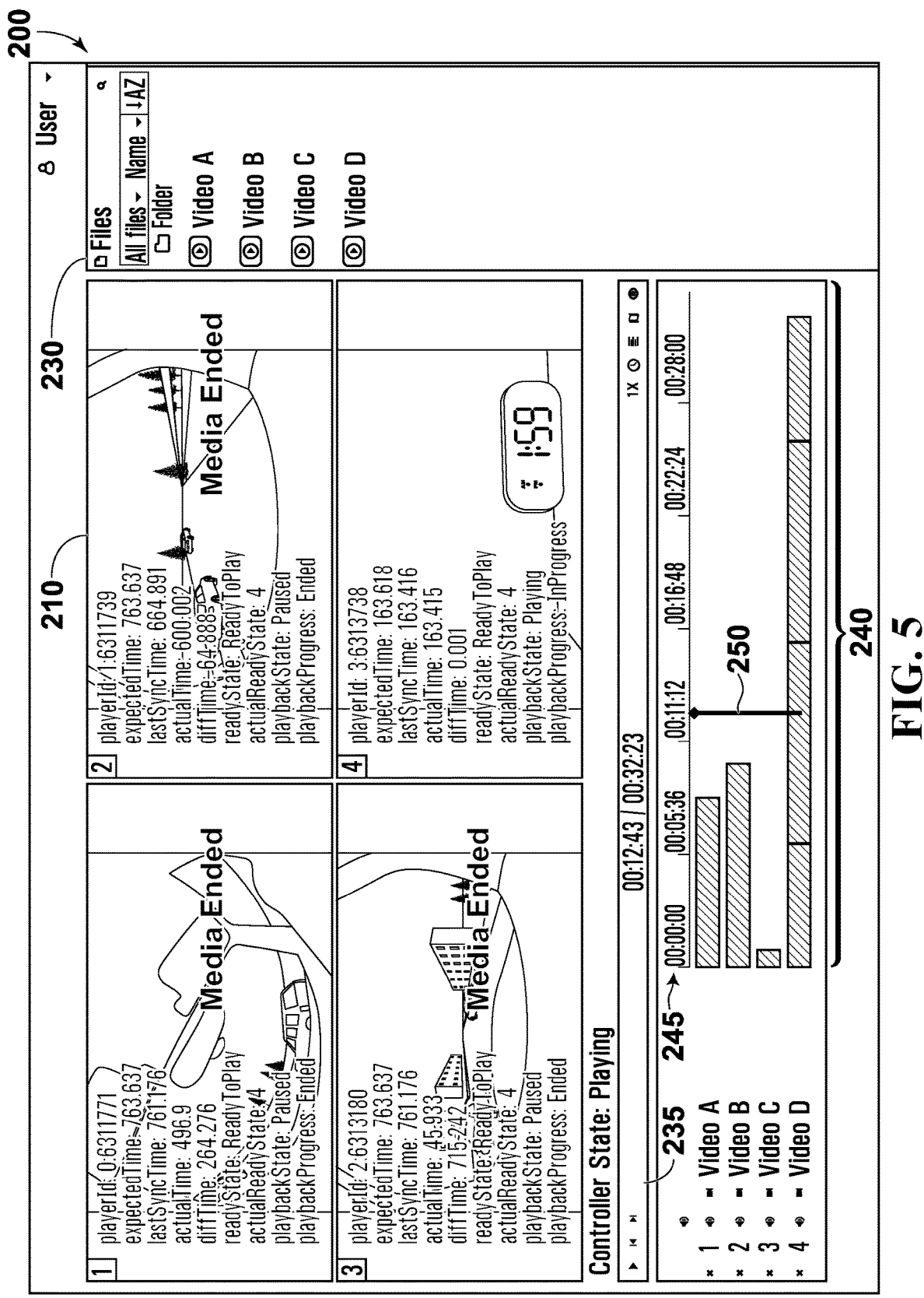
FIG. 5 depicts an example of a web page displayed by the web browser showing media content, e.g., a video stream, comprising multiple segments of media content.

FIG. 5 depicts an example of a web page 200 displayed by the web browser showing media content, e.g., a video stream, comprising multiple segments of media content. In implementations, segments of media content may represent a chronological sequence for a particular video stream, such as, for example, the video feed of a particular surveillance camera, i.e., said segments of media content may be temporally contiguous. In the example depicted, the reference timeline 240 presents a bar chart below the time axis 245 representing the start time, duration, and end time of each media file of the set of selected media files. In this example, the fourth media file (i.e., the bottom-most bar of the bar chart) comprises four segments.

Figure 6:
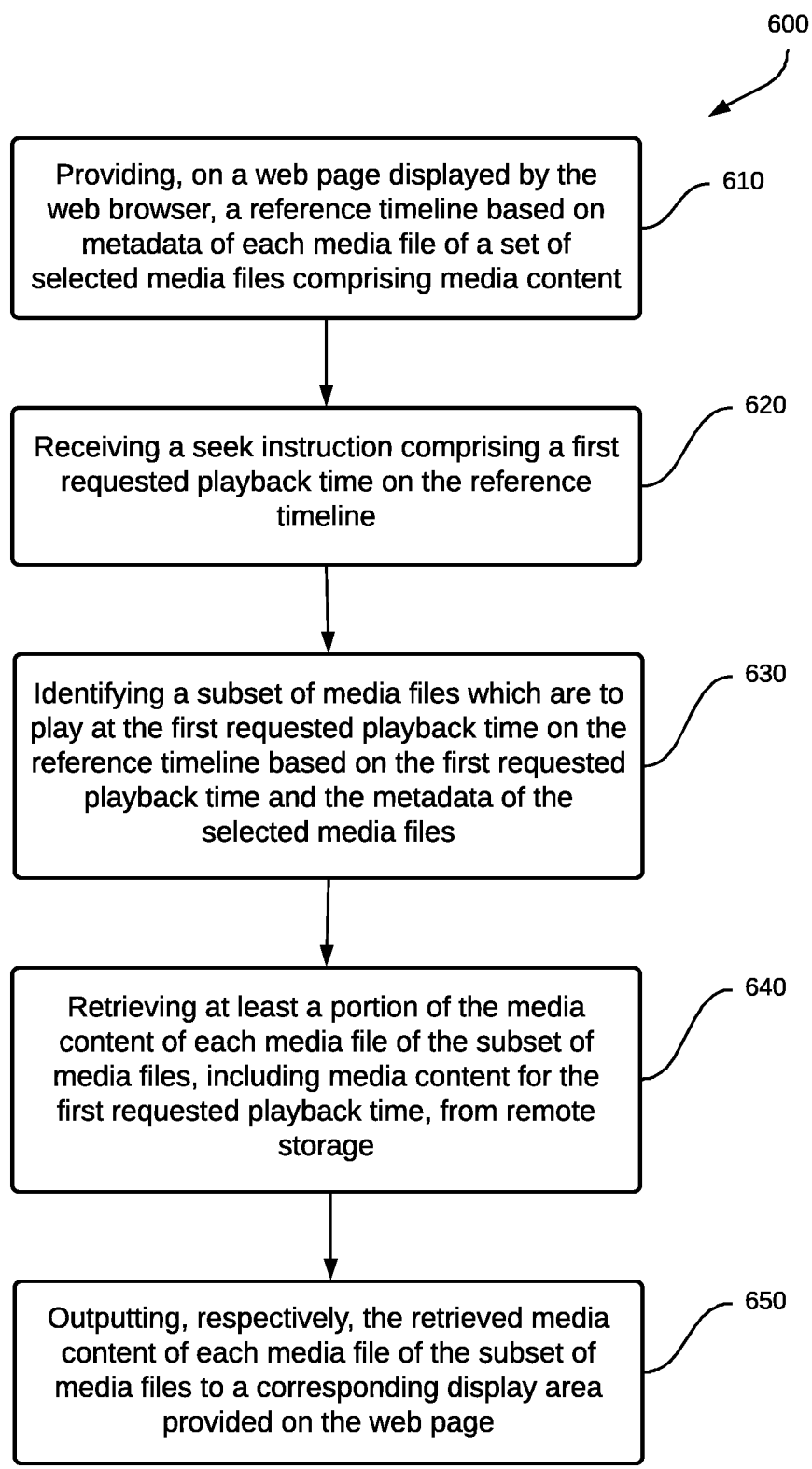
FIG. 6 is a flow chart of a method to seek a requested playback time for multiple remotely stored media files concurrently playing in a web browser running on a client computer.

FIG. 6 is a flow chart of a method 600 to seek a requested playback time for multiple remotely stored media files concurrently playing in a web browser running on a client computer. The method 600 may be implemented by the system 100 described herein. The method 600 includes providing, on a web page displayed by the web browser running on the client computer, a reference timeline based at least in part on metadata of each media file of a set of selected media files comprising media content (610). The method further includes receiving a seek instruction comprising a first requested playback time on the reference timeline (620). The method further includes identifying a subset of media files, of the set of selected media files, which are to play at the first requested playback time on the reference timeline based at least in part on the first requested playback time on the reference timeline and the metadata of each media file of the set of selected media files (630). The method further includes retrieving at least a portion of the media content of each media file of the subset of media files, including media content of each media file of the subset of media files for the first requested playback time, from remote storage via the network interface of the client computer (640). The method further includes outputting, respectively, the retrieved media content of each media file of the subset of media files to a corresponding display area of a plurality of display areas provided on the web page (650).

The method 600 may include one or more of the following aspects which are not shown in FIG. 6. For example, in the receiving (620) of the seek instruction, the seek instruction may be produced by user interaction with controls provided on the web page displayed by the web browser running on the client computer. In the identifying (630) of the subset of media files which are to play at the first requested playback time on the reference timeline, the method 600 may further include calculating a respective first expected playing time of each media file, of the set of selected media files, based at least in part on the first requested playback time on the reference timeline and the metadata of each media file of the set of selected media files. The calculating of the respective first expected playing time of each media file, of the set of selected media files, may be based at least in part on a respective start time of each media file of the set of selected media files. The first requested playback time on the reference timeline may be expressed as an absolute time and the respective first expected playing time of each media file, of the set of selected media files, may be expressed as a relative time based at least in part on a respective start time of each media file of the set of selected media files.

The retrieving (640) of at least a portion of the media content of each media file of the subset of media files, including media content of each media file of the subset of media files for the first requested playback time, may be based at least in part on the respective first expected playing time of each media file of the subset of media files.

In the identifying (630) a subset of media files which are to play at the first requested playback time on the reference timeline, the subset of media files may be identified to exclude media files, of the set of selected media files, having a first expected playing time which is outside of a range defined by a start time and an end time of a respective media file of the set of selected media files. A start time of the reference timeline may be determined by an earliest start time of the set of selected media files and an end time of the reference timeline may be determined by an latest end time of the set of selected media files.

The method 600 may further include loading at least a portion of the media content of each media file of the set of selected media files from remote storage via the network interface of the client computer into a respective media player of a plurality of media players instantiated on the client computer, wherein a subset of media players, of the plurality of media players, corresponds to the subset of media files.

The outputting (650), respectively, the retrieved media content of each media file of the subset of media files may be performed via a controller having a set of defined operating states. In such a case, the controller may enter a waiting-to-play operating state in which the controller instructs each media player of the subset of media players to enter a paused state; and the controller may enter a playing operating state, when the media players of the subset of media players provide an indication of being ready to play, in which the controller instructs each media player of the subset of media players to enter a play state.

The method 600 may further include periodically adjusting a current player time of each media player of the subset of media players, the current player time corresponding to a playing time of a media file loaded therein, while each media player of the subset of media players outputs, respectively, the media content of each media file of the subset of media files to the corresponding display area of the plurality of display areas. The periodic adjusting of the current player time of each media player of the subset of media players may include receiving periodically, by the controller, an actual player time from each media player of the subset of media players; comparing, for each media player of the subset of media players, the received actual player time with the current player time to determine a player time difference; entering the waiting-to-play operating state by the controller when the player time difference of one or more media players of the subset of media players exceeds a defined threshold; instructing each media player of the subset of media players to seek the current player time; and entering the playing operating state of the controller when the media players of the subset of media players provide an indication of being ready to play.

The loading of the at least a portion of the media content of each media file of the set of selected media files into a respective media player of the plurality of media players may be performed via a controller having a set of defined operating states, with the controller entering a paused operating state, in which the controller instructs each media player of the subset of media players to enter a paused state. In such a case, the method 600 may further include loading a specified media player, of the plurality of media players, with the metadata and at least a portion of the media content of a specified media file of the remotely stored media files. The method 600 may further include calculating a new reference timeline based at least in part on the metadata of the specified media file. The method 600 may further include registering the specified media player with the controller by sending to the controller an identifier and a playback state of the specified media player and at least a portion of the metadata of the specified media file, wherein said at least a portion of the metadata comprises at least two of: a start time, a duration, and an end time, of the specified media file.

The method 600 may further include receiving a seek instruction comprising a second requested playback time on the reference timeline. A second subset of media files, of the set of selected media files, may be identified which are to play at the second requested playback time on the reference timeline based at least in part on the second requested playback time on the reference timeline and the metadata of each media file of the set of selected media files. A respective second expected playing time of each media file, of the set of selected media files, may be calculated based at least in part on the second requested playback time on the reference timeline and the metadata of each media file of the set of selected media files. The method 600 may further include outputting, respectively, the media content of each media file of the second subset of media files to a corresponding display area of the plurality of display areas provided on the web page.

Figure 7:
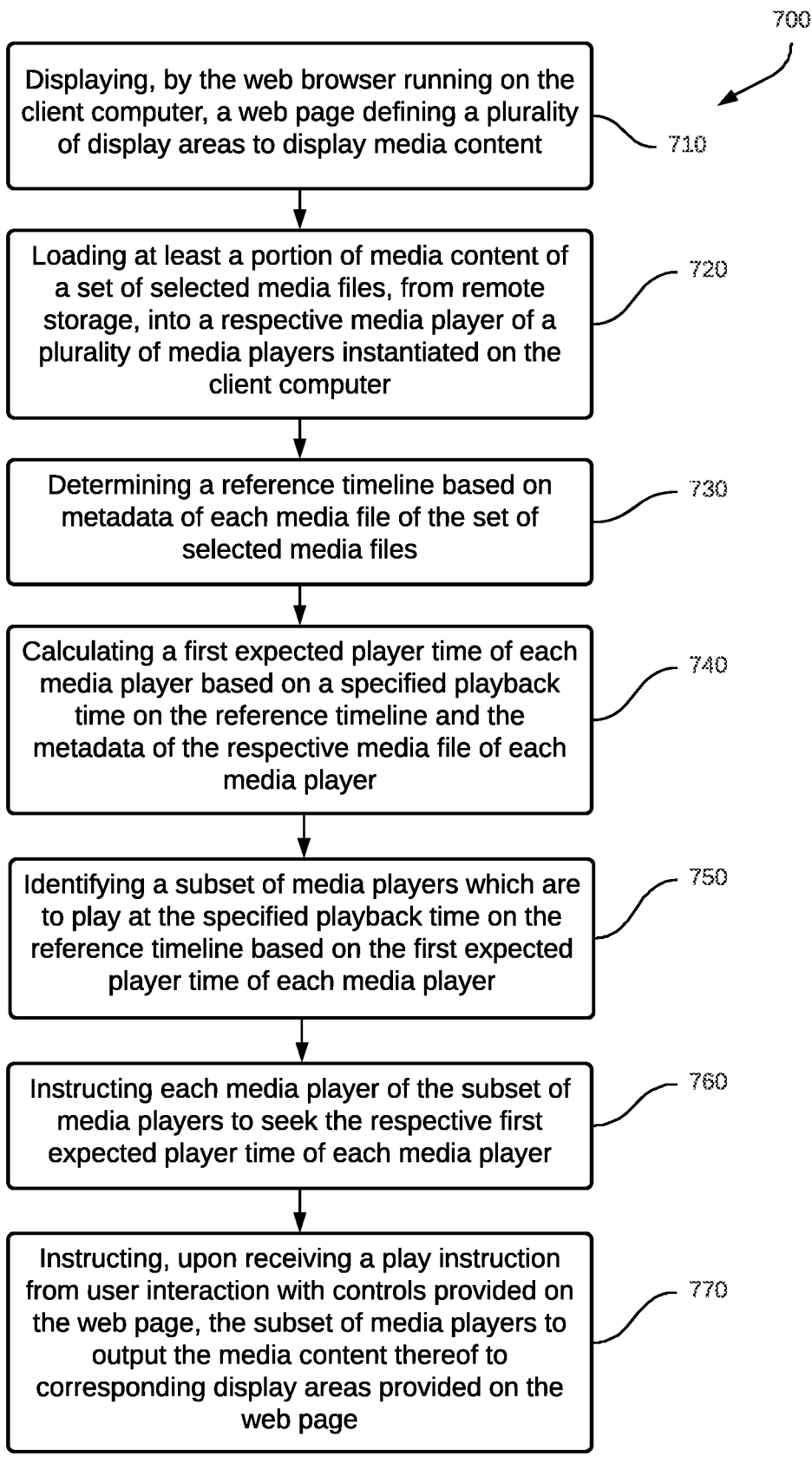
FIG. 7 is a flow chart of a method to concurrently display and play back multiple remotely stored media files in a web browser running on a client computer.

FIG. 7 is a flow chart of a method 700 to concurrently display and play back multiple remotely stored media files in a web browser running on a client computer. The method 700 may be implemented by the system 100 described herein. The method 700 includes displaying, by the web browser running on the client computer, a web page defining a plurality of display areas to display media content (710). The method 700 further includes loading at least a portion of media content of each media file, of a set of selected media files, from remote storage via the network interface of the client computer, into a respective media player of a plurality of media players instantiated on the client computer (720). A reference timeline is determined based at least in part on metadata of each media file of the set of selected media files (730). The method 700 further includes calculating a first expected player time of each media player of the plurality of media players based at least in part on a specified playback time on the reference timeline and the metadata of the respective media file of each media player of the plurality of media players (740). The method 700 further includes identifying a subset of media players, of the plurality of media players, which are to play at the specified playback time on the reference timeline based at least in part on the first expected player time of each media player of the plurality of media players (750). Each media player of the subset of media players is instructed to seek the respective first expected player time of each media player of the subset of media players (760). The method 700 further includes instructing, upon receiving a play instruction from user interaction with controls provided on the web page displayed by the web browser running on the client computer, the media players of the subset of media players to output, respectively, the media content thereof to a corresponding display area of the plurality of display areas provided on the web page (770).

Figure 8:
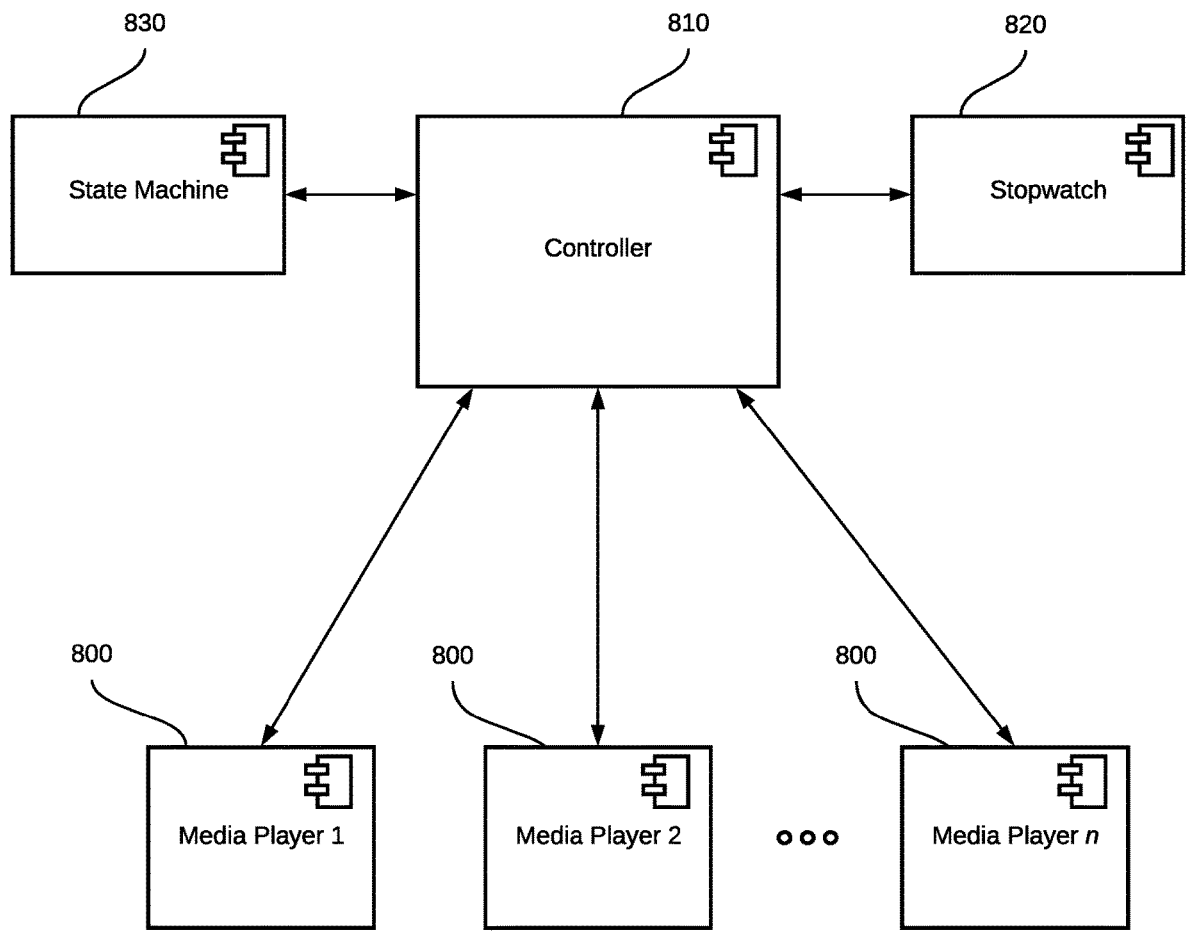
FIG. 8 is a diagram depicting software components, including media players and a controller.

FIG. 8 is a diagram depicting software components, including a number of media players 800 and a controller 810. An individual software component may be, for example, a software package, a web service, a web resource, a module that encapsulates a set of related functions and/or data, etc. In implementations, the client computer 110 may load at least a portion of the media content of each media file of the set of selected temporally contiguous media files from remote storage (e.g., the media data storage subsystem 150) via the network interface 115 of the client computer 110 into a respective media player 800 of a plurality of media players instantiated in memory 114 by the one or more processors 112 of the client computer 110 (see FIG. 1). In implementations, the loading of the selected temporally contiguous media files into the respective media players 800 may be performed via a controller 810 instantiated in memory 114 by the one or more processors 112 of the client computer 110. Upon being loaded with a specified media file, a specified media player 800 may be registered with the controller 810 by sending to the controller 810 an identifier and a playback state of the specified media player 800 and at least a portion of the metadata of the specified media file, which may include at least two of: a start time, a duration, and an end time, of the specified media file. As explained above with respect to FIG. 5, the web browser may show media content, e.g., a video stream, comprising multiple segments of media content. In implementations, segments of media content may represent a chronological sequence for a particular video stream, such as, for example, the video feed of a particular surveillance camera. In some embodiments, if a particular display area 210 (see FIG. 5) is associated with multiple segments of media content, each segment may be loaded into its own media player 800. This allows for making a smooth transition between segments being displayed in the particular display area 210, because, inter alia, each segment is independently buffered.

As explained above, the client computer 110 identifies a subset of media files, of the set of selected media files, which are to play in the display areas 210 of the web page 200 at a requested playback time on the reference timeline 240. Therefore, a subset of media players 800, of the plurality of media players 800, corresponds to the subset of media files which are to play at the requested playback time. In implementations, the controller 810 maintains a list of the state that each of the media players 800 should currently be in, according to the processes described herein, e.g., a play state, a paused state, etc. The controller 810 may also keep track of current states of the media players 800, as reported by the media players 800 to the controller 810.

The controller 810 may communicate with a stopwatch 820, which computes an incremental (e.g., at a frequency of 60 Hz) reference time for the system 100 based on the reference timeline 240 and notifies the controller 810 at each time increment. For example, if a user selects a particular requested playback time on the reference timeline 240 at which to play the set of selected media files, as described above with respect to FIG. 2, the stopwatch is set to the requested playback time and begins incrementing and sending notifications to the controller 810. In implementations, when the playback time relative to the reference timeline 240 changes (e.g., due to a user performing a seek to a different time), the controller 810 may calculate an updated expected playing time for each media player 800 (i.e., an updated expected playing time for each corresponding media file) based at least in part on a difference between the new playback time and a respective start time of each media player 800 (i.e., a start time of each corresponding media file).

Figure 9:
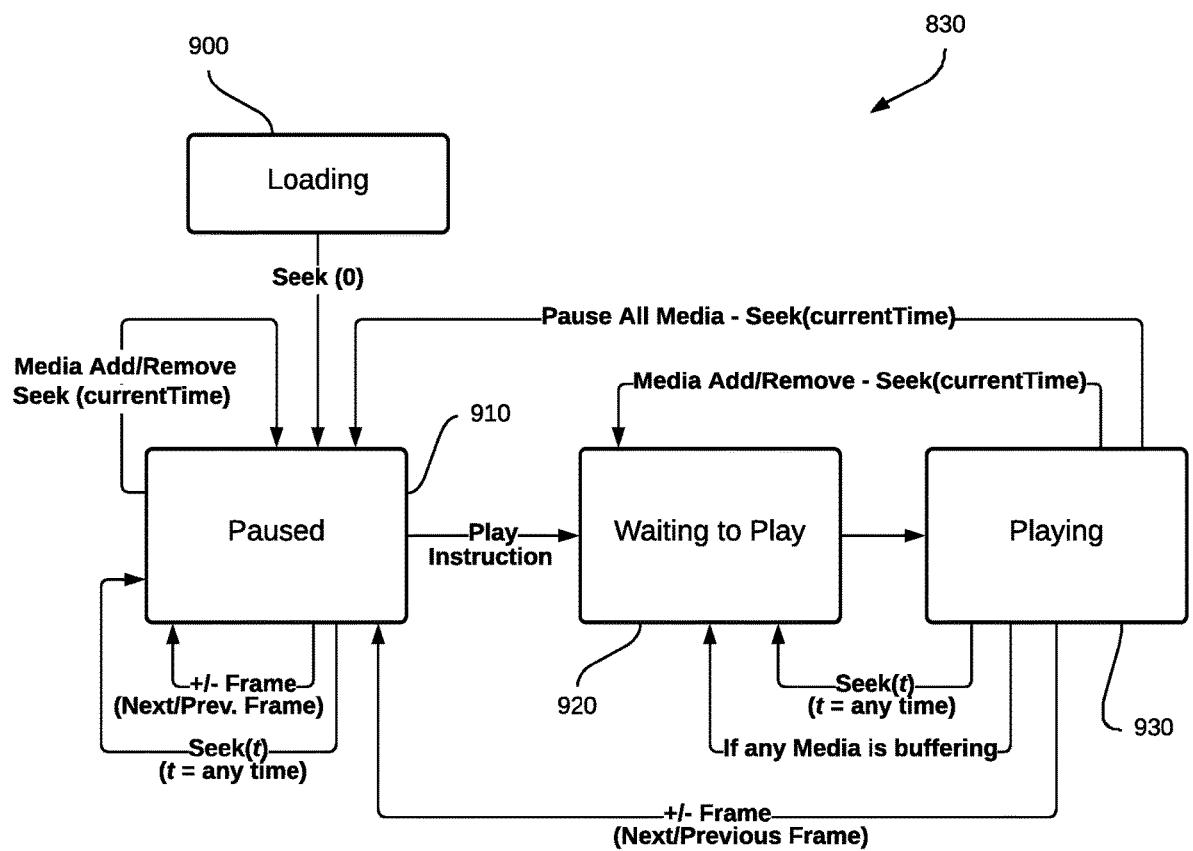
FIG. 9 depicts a set of defined operating states of the controller which are implemented by a state machine.

The controller 810 may periodically adjust a current player time of each media player 800 (i.e., the current player time corresponding to a current playing time of a media file loaded therein), while the media players 800 are playing, as discussed in further detail with respect to FIG. 9.

The controller 810 may communicate with a state machine 830 which effectuates a set of defined operating states of the controller, as discussed in further detail with respect to FIG. 9.

FIG. 9 depicts a set of defined operating states of the controller 810 which are implemented by the state machine 830. The controller 810 enters a loading operating state 900 implemented by the state machine 830 when one or more specified media files are selected to be loaded into respective media players 800. After the media players 800 are loaded, the controller 810 executes a seek time zero process (Seek(0)) to instruct the media players 800 to seek the beginning of each loaded media file, i.e., relative time 0:00:00 in each media file. The controller 810 then enters a paused operating state 910, in which the controller 810 instructs the media players to enter a paused state. The paused operating state 910 may also be entered directly from a playing operating state 930, as discussed below.

The media players 800 remain in the paused operating state 910 upon selection and loading of additional media files ("Media Add/Remove"), in which case the controller 810 executes a Seek(currentTime), i.e., a seek process to instruct the media players 800 to seek a specified current time (e.g., provided by the stopwatch 820). In implementations, a new reference timeline 240 may be calculated based at least in part on the metadata of the newly loaded media file or media files. This is done because the newly loaded media files may have start times which precede the start of the reference timeline 240 and/or end times which extend beyond the end time of the reference timeline 240.

As explained above, the retrieved media content of each media file of the subset of media files is output to a corresponding display area 210 of a plurality of display areas 210 provided on the web page 200. The outputting may be performed via the controller 810 operating according to the set of defined operating states. For example, the controller 810 may enter a waiting-to-play operating state 920 in which the controller 810 instructs each media player 800 of the subset of media players to enter a paused state. The controller 810 may enter a playing operating state 930 when the media players 800 of the subset of media players provide an indication of being ready to play. In such a case, the controller 810 instructs each media player 800 of the subset of media players to enter a play state.

In implementations, there may be a periodic adjusting of a current player time of each media player 800 of the subset of media players. The current player time corresponds to a playing time of a respective media file loaded in a respective media player 800 while the media file is output to the corresponding display area 210 of the plurality of display areas 210, as described above. In some implementations, the periodic adjusting of the current player time of each media player 800 of the subset of media players may include periodically receiving, by the controller 810, an actual player time from each media player 800 of the subset of media players and comparing the received actual player time with the current player time to determine a player time difference. The player time difference may arise from the operational characteristics of the underlying network 130 (see FIG. 1) connections used by the client computer 110 to retrieve the media files, e.g., from the server 120. For example, there may be packet loss, or other types of degraded network performance, and/or differences in relative download speed between media files, The controller 810 may enter the waiting-to-play operating state 920 when the player time difference of one or more media players 800 of the subset of media players exceeds a defined threshold. In such a case, the controller 810 may instruct each media player 800 of the subset of media players to seek the current player time. The controller 810 may enter the playing operating state 930 when the media players 800 of the subset of media players provide an indication of being ready to play. In implementations, the indication of being read to play may be an indication that a media player is not in the process of buffering.

Figure 10:
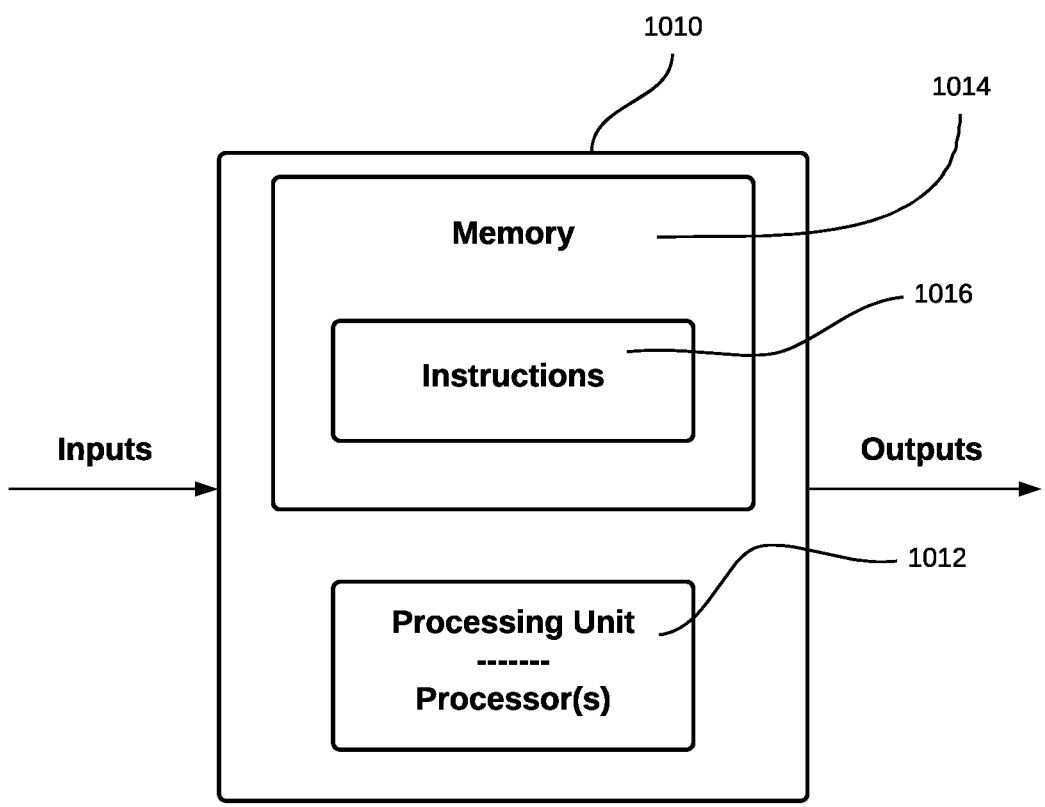
FIG. 10 is a block diagram of an example of a computing device usable to implement the methods described herein.

FIG. 10 is a block diagram of an example of a computing device usable to implement the methods described herein. The method(s) described herein may be implemented by a computing device 1010, comprising at least one processing unit 1012 and at least one memory 1014 which has stored therein computer-executable instructions 1016. The client computer 110 and the server/computer system 120, as well as other components described herein, may each be implemented by and/or comprise a computing device, such as the computing device 1010. In implementations where the server 110 is a cloud-based computing infrastructure, the cloud-based computing infrastructure may comprise a plurality of computing devices, such as the computing device 1010. The processing unit 1012 may comprise one or more processors or any other suitable devices configured to implement the method(s) described herein such that instructions 1016, when executed by the computing device 1010 or other programmable apparatus, may cause the method(s) described herein to be executed. The processing unit 1012 may comprise, for example, any type of general-purpose or specialized microprocessor or microcontroller, a digital signal processing (DSP) processor, a central processing unit (CPU), a graphical processing unit (GPU), an integrated circuit, a field programmable gate array (FPGA), a reconfigurable processor, other suitably programmed or programmable logic circuits, or any combination thereof. The processing unit 1012 may be referred to as a "processor" or a "computer processor".

The memory 1014 may comprise any suitable machine-readable storage medium. The memory 1014 may comprise non-transitory computer readable storage medium, for example, but not limited to, an electronic, magnetic, optical, electromagnetic, infrared, or semiconductor system, apparatus, or device, or any suitable combination of the foregoing. The memory 1014 may include a suitable combination of any type of computer memory that is located either internally or externally to the device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 1014 may comprise any storage means (e.g., devices) suitable for retrievably storing machine-readable instructions 1016 executable by processing unit 912.

The methods and systems described herein may be implemented in a high-level procedural or object-oriented programming or scripting language, or a combination thereof, to communicate with or assist in the operation of a computer system, for example the computing device 1010. Alternatively, or in addition, the methods and systems described herein may be implemented in assembly or machine language. The language may be a compiled or interpreted language. Program code for implementing the methods and systems described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the methods described herein. Embodiments of the methods and systems described herein may also be considered to be implemented by way of a non-transitory computer-readable storage medium having a computer program stored thereon. The computer program may comprise computer-readable instructions which cause a computer, or in some embodiments the processing unit 1012 of the computing device 1010, to operate in a specific and predefined manner to perform the methods described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. Those of skill in the art will recognize that many of the methods or algorithms set out herein may employ additional acts, may omit some acts, and/or may execute acts in a different order than specified. The various implementations described above can be combined to provide further implementations.

These and other changes can be made to the implementations in light of the above-detailed description. In general, in the following claims, the terms used should not be construed to limit the claims to the specific implementations disclosed in the specification and the claims but should be construed to include all possible implementations along with the full scope of equivalents to which such claims are entitled. Accordingly, the claims are not limited by the disclosure.

What is claimed is:

1. A method to seek a requested playback time for concurrently playing in a display area of a plurality of display areas provided on a web page of a web browser, running on a client computer having one or more processors, memory, and a network interface, remotely stored media files of multiple media sources, each one of said multiple media sources providing segments of media content corresponding to the remotely stored media files, the method comprising:

a) providing, on said web page displayed by the web browser running on the client computer, a reference timeline based at least in part on metadata of a set of remotely stored media files of said remotely stored media files associated with each one of said media sources;

b) receiving a seek instruction comprising a first requested playback time on the reference timeline;

c) identifying a subset of remotely stored media files of said set of remotely stored media files associated with each of said multiple media sources, which are to play at the first requested playback time on the reference timeline based at least in part on the first requested playback time on the reference timeline and the metadata of the subset of remotely stored media files associated with each one of said media sources, wherein said identifying includes calculating a respective first expected playing time of each media file of the subset of remotely stored media files, based at least in part on said first requested playback time on the reference timeline and the metadata of each media file of the subset of remotely stored media files;

d) retrieving a portion of the media content of each media file of the subset of remotely stored media files associated with each of said multiple media sources for the first requested playback time of said seek instruction, from remote storage via the network interface of the client computer;

e) loading said portion of the media content of each media file of the subset of remotely stored media files into a respective buffer of a plurality of buffers, each buffer of the plurality of buffers associated with a corresponding display area of said plurality of display areas;

f) monitoring each buffer associated with each corresponding display area of said plurality of display areas; and g) outputting, respectively, the retrieved media content of each media file of the subset of remotely stored media files associated with each of said multiple media sources to said corresponding display area associated with each media source of said plurality of display areas provided on the web page, when each buffer associated with each corresponding display area of said plurality of display areas is in a suitable state for a playback of the retrieved media content in synchronization.

2. The method of claim 1, wherein, in said receiving a seek instruction, the seek instruction is produced by user interaction with controls provided on the web page displayed by the web browser running on the client computer.

3. The method of claim 1, wherein said calculating a respective first expected playing time of each media file, of the subset of remotely stored media files, is based at least in part on a respective start time of each media file of the subset of remotely stored media files.

4. The method of claim 3, wherein the first requested playback time on the reference timeline is expressed as an absolute time and the respective first expected playing time of each media file, of the subset of remotely stored media files, is expressed as a relative time based at least in part on a respective start time of each media file of the subset of remotely stored media files.

5. The method of claim 1, wherein said retrieving a portion of the media content of each media file of the subset of remotely stored media files associated with each of said multiple media sources for the first requested playback time, is based at least in part on the respective first expected playing time of each media file of the subset of remotely stored media files.

6. The method of claim 1, wherein in said identifying a subset of remotely stored media files which are to play at the first requested playback time on the reference timeline, the subset of remotely stored media files is identified to exclude media files, of the set of remotely stored media files, having a first expected playing time which is outside of a range defined by a start time and an end time of a respective media file of the set of remotely stored media files.

7. The method of claim 1, wherein a start time of the reference timeline is determined by an earliest start time of the set of remotely stored media files and an end time of the reference timeline is determined by an latest end time of the set of remotely stored media files.

8. The method of claim 1, further comprising loading said portion of the media content of each media file of the set of remotely stored media files from remote storage via the network interface of the client computer into a respective media player of a plurality of media players instantiated on the client computer, wherein a subset of media players, of the plurality of media players, corresponds to the subset of remotely stored media files.

9. The method of claim 8, wherein said loading a portion of the media content of each media file of the set of remotely stored media files into a respective media player of the plurality of media players is performed via a controller having a set of defined operating states, the controller entering a paused operating state, in which the controller instructs each media player of the subset of media players to enter a paused state, the method further comprising:

loading a specified media player, of the plurality of media players, with the metadata and at least a portion of the media content of a specified media file of the remotely stored media files.

10. The method of claim 9, further comprising calculating a new reference timeline based at least in part on the metadata of the specified media file.

11. The method of claim 9, further comprising:

registering the specified media player with the controller by sending to the controller an identifier and a playback state of the specified media player and at least a portion of the metadata of the specified media file, wherein said at least a portion of the metadata comprises at least two of: a start time, a duration, and an end time, of the specified media file.

12. The method of claim 1, further comprising:

receiving a seek instruction comprising a second requested playback time on the reference timeline;

identifying a second subset of media files, of the set of remotely stored media files, which are to play at the second requested playback time on the reference timeline based at least in part on the second requested playback time on the reference timeline and the metadata of each media file of the set of remotely stored media files;

calculating a respective second expected playing time of each media file, of the set of remotely stored media files, based at least in part on the second requested playback time on the reference timeline and the metadata of each media file of the set of selected remotely stored media files; and outputting, respectively, the media content of each media file of the second subset of media files to a corresponding display area of the plurality of display areas provided on the web page.

13. A system to seek a requested playback time for multiple remotely stored media files concurrently playing in a web browser, the system including a client computer comprising one or more processors, memory, and a network interface, the memory storing a set of instructions that, as a result of execution by the one or more processors, cause the one or more processors to perform the method of claim 1.

14. The method of claim 1, further comprising:
monitoring the playback for unsynchronized playing of the retrieved media content in said plurality of display areas; and
resynchronizing the playback in said plurality of display areas in response to detecting that a time difference in playback times of at least some of the retrieved media content playing in said plurality of display areas exceeds a defined threshold.

15. The method of claim 1, wherein said steps a) through g) are performed by a server sending through said network interface to said client computer data and browser instructions.

16. A non-transitory computer-readable storage medium having computer-executable instructions stored thereon that, when executed, cause at least one computer processor of the server to perform the method of claim 15.

17. A method to seek a requested playback time for multiple remotely stored media files concurrently playing in a web browser running on a client computer having one or more processors, memory, and a network interface, the method comprising:
a) providing, on a web page displayed by the web browser running on the client computer, a reference timeline based at least in part on metadata of each media file of a set of selected media files comprising media content;
b) receiving a seek instruction comprising a first requested playback time on the reference timeline;
c) a subset of media files, of the set of selected media files, which are to play at the first requested playback time on the reference timeline based at least in part on the first requested playback time on the reference timeline and the metadata of each media file of the set of selected media files;
d) retrieving a portion of the media content of each media file of the subset of media files, including media content of each media file of the subset of media files for the first requested playback time, from remote storage via the network interface of the client computer;
e) loading said portion of the media content of each media file of the subset of media files into a respective buffer of a plurality of buffers, each buffer of the plurality of buffers associated with a corresponding display area of said plurality of display areas;
f) monitoring each buffer associated with each corresponding display area of said plurality of display areas; and
g) outputting, respectively, the retrieved media content of each media file of the subset of media files to said corresponding display area of said plurality of display areas provided on the web page, when each buffer associated with each corresponding display area of said plurality of display areas is in a suitable state for a playback of the retrieved media content in synchronization, h) further comprising loading said portion of the media content of each media file of the set of selected media files from remote storage via the network interface of the client computer into a respective media player of a plurality of media players instantiated on the client computer, wherein a subset of media players, of the plurality of media players, corresponds to the subset of media files,
i) wherein said outputting, respectively, the retrieved media content of each media file of the subset of media files is performed via a controller having a set of defined operating states, the controller:
j) entering a waiting-to-play operating state in which the controller instructs each media player of the subset of media players to enter a paused state; and
k) entering a playing operating state, when the media players of the subset of media players provide an indication of being ready to play, in which the controller instructs each media player of the subset of media players to enter a play state.

18. The method of claim 17, further comprising periodically adjusting a current player time of each media player of the subset of media players, the current player time corresponding to a playing time of a media file loaded therein, while each media player of the subset of media players outputs, respectively, the media content of each media file of the subset of media files to the corresponding display area of the plurality of display areas.

19. The method of claim 18, wherein said periodically adjusting the current player time of each media player of the subset of media players comprises:
receiving periodically, by the controller, an actual player time from each media player of the subset of media players;
comparing, for each media player of the subset of media players, the received actual player time with the current player time to determine a player time difference;
entering the waiting-to-play operating state by the controller when the player time difference of one or more media players of the subset of media players exceeds a defined threshold;
instructing each media player of the subset of media players to seek the current player time; and
entering the playing operating state of the controller when the media players of the subset of media players provide an indication of being ready to play.

20. The method of claim 17, wherein said steps a) through g) are performed by a server sending through said network interface to said client computer data and browser instructions.

21. A non-transitory computer-readable storage medium having computer-executable instructions stored thereon that, when executed, cause at least one computer processor of the server to perform the method of claim 20.

22. A method to concurrently display and play back multiple remotely stored media files in a web browser running on a client computer having one or more processors, memory, and a network interface, the method comprising:
displaying, by the web browser running on the client computer, a web page defining a plurality of display areas to display media content;
loading a portion of media content of each media file, of a set of selected media files, from remote storage via the network interface of the client computer into a respective media player of a plurality of media players instantiated on the client computer;

determining, using the processor, a reference timeline based at least in part on metadata of each media file of the set of selected media files;

calculating a first expected player time of each media player of the plurality of media players based at least in part on a specified playback time on the reference timeline and the metadata of the respective media file of each media player of the plurality of media players;

identifying a subset of media players, of the plurality of media players, which are to play at the specified playback time on the reference timeline based at least in part on the first expected player time of each media player of the plurality of media players;

instructing each media player of the subset of media players to seek the respective first expected player time of each media player of the subset of media players;

loading said portion of the media content of each media file of the subset of media files into a respective buffer of a plurality of buffers, each buffer of the plurality of buffers associated with a corresponding display area of said plurality of display areas;

monitoring each buffer associated with each corresponding display area of said plurality of display areas; and instructing, upon receiving a play instruction from user interaction with controls provided on the web page displayed by the web browser running on the client computer, the media players of the subset of media players to output, respectively, the media content thereof to said corresponding display area of the plurality of display areas provided on the web page, when each buffer associated with each corresponding display area of said plurality of display areas is in a suitable state for a playback of the retrieved media content in synchronization.

23. The method of claim 22, wherein in said identifying a subset of media players which are to play at the specified playback time on the reference timeline, the subset excludes media players, of the plurality of media players, having a first expected player time which is outside of a range defined by a start time of a respective media file of a respective media player and an end time of a respective media file of the respective media player.

24. The method of claim 22, wherein said instructing the media players of the subset of media players to output, respectively, the media content thereof to the corresponding display area of the plurality of display areas provided on the web page is performed via a controller having a set of defined operating states, the controller:

entering a waiting-to-play operating state in which the controller instructs each media player of the subset of media players to enter a paused state; and entering a playing operating state, when the media players of the subset of media players provide an indication of being ready to play, whereupon the controller instructs each media player of the subset of media players to enter a play state.

25. The method of claim 24, further comprising periodically adjusting a current player time of each media player of the subset of media players, the current player time corresponding to a playing time of a media file loaded therein, while each media player of the subset of media players outputs, respectively, the media content thereof to the corresponding display area of the plurality of display areas.

26. The method of claim 25, wherein said periodically adjusting the current player time of each media player of the subset of media players comprises:

receiving periodically, by the controller, an actual player time from each media player of the subset of media players;

comparing, for each media player of the subset of media players, the received actual player time with the current player time to determine a player time difference;

entering the waiting-to-play operating state by the controller when the player time difference of one or more media players of the subset of media players exceeds a defined threshold;

instructing each media player of the subset of media players to seek the current player time; and entering the playing operating state of the controller when the media players of the subset of media players provide an indication of being ready to play.

27. The method of claim 22, wherein said loading at least a portion of media content of each media file, of a set of selected media files into a respective media player of a plurality of media players is performed via a controller having a set of defined operating states, the controller entering a paused operating state, in which the controller instructs each media player of the subset of media players to enter a paused state, the method further comprising:

loading a specified media player, of the plurality of media players, with the metadata and said at least a portion of the media content of a specified media file of the remotely stored media files.

28. The method of claim 27, further comprising calculating a new reference timeline based at least in part on the metadata of the specified media file.

29. The method of claim 27, further comprising:

registering the specified media player with the controller by sending to the controller an identifier and a playback state of the specified media player and at least a portion of the metadata of the specified media file, wherein said at least a portion of the metadata comprises at least two of: a start time, a duration, and an end time, of the specified media file.

30. A non-transitory computer-readable storage medium having computer-executable instructions stored thereon that, when executed, cause at least one computer processor to perform the method of claim 22.

* * * * *